US006925566B1

(12) United States Patent
Feigen et al.

(10) Patent No.: US 6,925,566 B1
(45) Date of Patent: Aug. 2, 2005

(54) REMOTE SYSTEM INTEGRITY VERIFICATION

(75) Inventors: Ronald Glen Feigen, Tempe, AZ (US); Richard Allen Perona, Gilbert, AZ (US); James T. Lynn, Mesa, AZ (US); Erwin Perry Comer, Queen Creek, AZ (US)

(73) Assignee: Motorola, Inc., Schaumburg, IL (US)

( * ) Notice: Subject to any disclaimer, the term of this patent is extended or adjusted under 35 U.S.C. 154(b) by 919 days.

(21) Appl. No.: 09/612,142

(22) Filed: Jul. 7, 2000

(51) Int. Cl.[7] .............................................. G06F 11/30
(52) U.S. Cl. ..................................... 713/187; 713/189
(58) Field of Search ............................... 713/187, 188, 713/201, 194, 171, 165; 380/258, 262, 46, 283; 714/38

(56) References Cited

U.S. PATENT DOCUMENTS

| 5,153,919 | A | * | 10/1992 | Reeds et al. .................. 380/44 |
| 5,432,852 | A | * | 7/1995 | Leighton et al. .............. 380/30 |
| 5,822,432 | A | * | 10/1998 | Moskowitz et al. .......... 380/28 |
| 5,919,257 | A | * | 7/1999 | Trostle ....................... 713/200 |
| 6,253,324 | B1 | * | 6/2001 | Field et al. .................. 713/187 |
| 6,263,431 | B1 | * | 7/2001 | Lovelace et al. .............. 713/2 |

* cited by examiner

Primary Examiner—Gregory Morse
Assistant Examiner—Andrew Nalven
(74) Attorney, Agent, or Firm—Ingrassia, Fisher & Lorenz, P.C.

(57) ABSTRACT

The integrity of a remote communication unit (14) in a communication system is verified by comparing a hash value generated within the remote unit (14) to a hash value generated within a local unit (24). An interrogation message is generated within an interrogating entity (10) that includes a random seed value, memory range information identifying a memory range within the remote unit that is to be hashed, and position information identifying a position at which the random seed value is to be located within a data stream generated within the remote unit (14). The interrogation message is then delivered to the remote unit (14) which then performs a hashing operation based upon the parameters within the interrogation message to generate a hash value. The hash value is then returned to the interrogating entity (10) for comparison with a control value.

16 Claims, 2 Drawing Sheets

REMOTE SYSTEM INTEGRITY VERIFICATION

FIELD OF THE INVENTION

The invention relates generally to communication systems and, more particularly, to techniques for verifying the integrity of remote communication units in a communication system.

BACKGROUND OF THE INVENTION

Many communication applications exist that require an end-user to purchase or lease equipment for use at a customer location to access communication services. For example, cable television systems commonly require the use of a set-top cable box at the customer location to provide customer access to the services of the cable television service provider. The customer located equipment is usually programmed or configured by the service provider in accordance with an agreed-upon service package purchased by the customer. For example, a cable television service provider may configure a set-top cable box so that it is only capable of providing certain channels to the customer based upon a contracted level of service purchased by the customer. To configure the customer-located equipment, the service provider will typically load and/or enable predetermined software and/or hardware within the equipment to activate the corresponding functionality.

As can be appreciated, the customer-located equipment is normally out of the physical control of the service provider. Thus, this equipment is particularly susceptible to incursion by hackers and others wishing to receive more than an agreed upon level of service. These hackers will commonly modify the customer-located equipment in a manner that allows additional features to be activated within the equipment or broader access rights to be had within the system. For example, a hacker may modify a set-top cable box so that it is capable of unscrambling cable channels which the customer has not paid for. Some hackers may even make modifications to the customer-located equipment that are designed to cause harm to the service provider or others. All such incursions are illegal and result in, at a minimum, a significant loss of revenue for the service provider.

Therefore, there is a need for a method and apparatus for verifying the integrity of remote units in a communication system.

DETAILED DESCRIPTION

Figure 1:
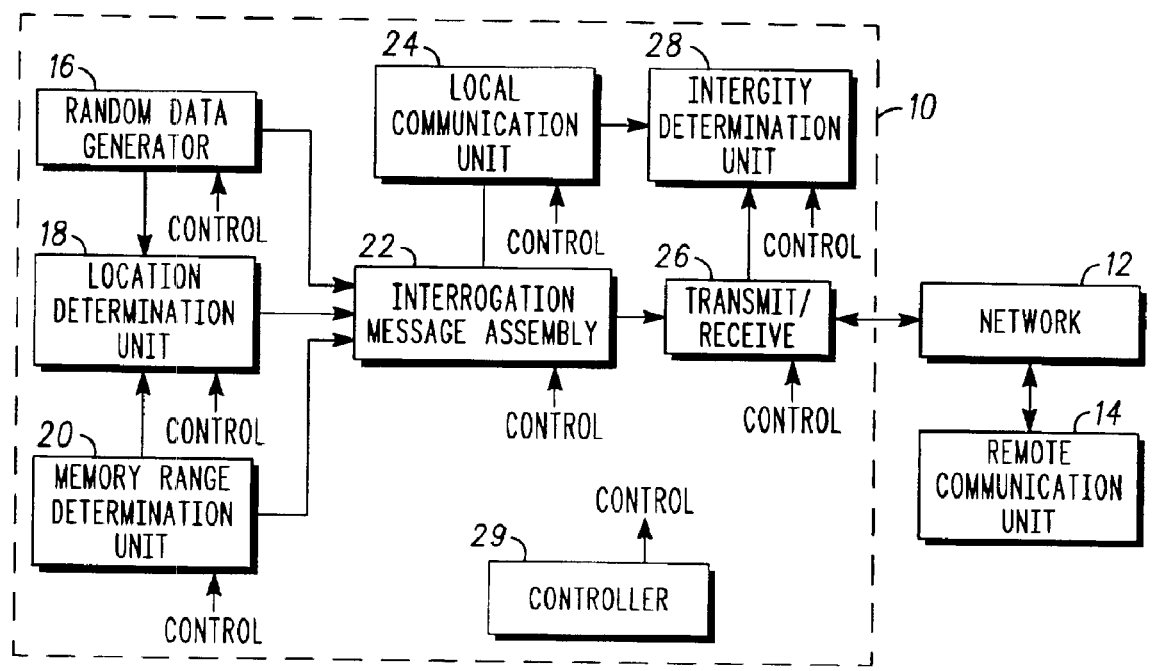
FIG. 1 is a block diagram illustrating a verification apparatus for use in verifying the integrity of remote communication units in a communication system in accordance with one embodiment of the present invention.

The present invention relates to a system that is capable of accurately and reliably verifying the integrity of remote communication units in a communication system. The system does not require physical access to the location of a remote unit to perform the integrity verification. Instead, all that is required is a two-way communication link between the entity performing the integrity verification and the remote unit being verified. The inventive system is particularly useful in applications that utilize customer-located communication equipment that is out of the physical control of the communication service provider. Such applications include, for example, cable television systems using remote user-located cable boxes, cellular telephone systems using portable user-located cell phones, satellite-based communications systems that use customer premises equipment (CPE) at the user location to provide access to the system, and local and wide area networks (LANs and WANs) that provide access to a number of remote communication nodes that are out of the physical control of the network administrator. In a preferred approach, the inventive principles are fully software-implemented and do not require the provision of any additional hardware. It should be appreciated, however, that hardware-based implementations are also possible.

As part of the verification process, the system uses a secure hashing algorithm to perform a hashing operation within the remote unit based on parameters provided by the entity requesting the integrity verification (i.e., the verification unit). The system also performs the same hashing operation (i.e., using the same parameters) within a local unit associated with the verification unit that is supposed to be an exact replica of the remote unit (e.g., a control unit that is known to remain unmodified). The hash values generated by the two units are compared to determine whether any modifications have occurred within the remote unit.

After a decision has been made to verify the integrity of a particular remote unit, the verification unit identifies a memory range or ranges within the remote unit the contents of which are to be hashed. The verification unit also generates a random seed value that is to be planted within the data stream being hashed in the remote unit. In addition, the verification unit determines the location within the data stream at which the random seed value is to be placed. The verification unit then delivers an interrogation signal to the remote unit that includes the memory range information, the random seed value, and the random seed value location information. The interrogation signal is also delivered to the local communication unit. The remote unit and the local unit then each perform the requested hash operation and each return a hash value to the verification unit. The verification unit then compares the values to determine whether any modifications have occurred within the remote unit. If the values are not the same, the system determines that modifications have been made and further investigation is initiated.

The randomness that is achieved by inserting a random seed value into the data stream being hashed makes it very difficult for a hacker to predict the correct result of an interrogation beforehand. In addition, a further degree of randomness can be achieved by randomly selecting the location at which the random seed value is placed within the data stream being hashed. Additional randomness can also be achieved by randomly selecting the memory area or areas within the remote unit that are to be hashed. Each level of randomness added to the interrogation request increases the difficulty of predicting the proper response value by a hacker at the customer location and thus increases the reliability of the verification process. It should be appreciated that the terms "random" and "randomness," as used herein, do not necessarily refer to perfect randomness but can also include partial or pseudo random numbers or selections.

FIG. 1 is a block diagram illustrating a verification unit 10 for use in verifying the integrity of remote communication units in a communication system in accordance with one embodiment of the present invention. The verification unit 10 can be located, for example, within the main facility of a communication service provider for use in verifying the integrity of customer-located communications equipment associated with the number of customers of the service provider. As illustrated, the verification unit 10 is coupled to a network 12 that allows the verification unit 10 to communicate with a remote communication unit 14. Although not illustrated, the network 12 will typically be coupled to a multitude of other remote communication units that can also be interrogated by the verification unit 10.

The network 12 can include virtually any form of communication medium including, for example, cable television lines, conventional telephone lines, fiber optic lines, satellite links, terrestrial wireless links, LANs, WANs, cellular telephone links, and others, in addition to combinations of the above. The remote communication unit 14 can include virtually any form of communication unit that is remote from the main location of a service provider. For example, the remote communication unit 14 can include a set-top cable box, a cellular telephone, CPE equipment associated with a satellite or terrestrial communication system, computer terminal equipment, and others.

As illustrated in FIG. 1, the verification unit 10 includes: a random data generator 16, a location determination unit 18, a memory range determination unit 20, an interrogation message assembly unit 22, a local communication unit 24, a transmit/receive unit 26, an integrity determination unit 28, and a controller 29. The controller 29 is operative for controlling the other elements of the verification unit 10 to perform the integrity verification function. It should be appreciated that the individual blocks constituting the verification unit 10 of FIG. 1 are functional in nature and do not necessarily correspond to discrete hardware elements. For example, in a preferred embodiment, two or more (or all) of these blocks are implemented in software within the same digital processor.

When the verification unit 10 determines that the integrity of the remote communication unit 14 needs to be verified, the random data generator 16 is used to generate a random seed value. The length of the random seed value can be fixed or random. By using a random length seed, an additional degree of randomness is achieved that increases the difficulty that a hacker will have in predicting a proper response to an interrogation message. The memory range determination unit 20 determines one or more ranges within the address space of the remote communication unit 14 that are to be hashed as part of the verification process. The location determination unit 18 determines a location within the data stream to be hashed at which to place the random seed value generated by the random data generator 16. The location identified by the location determination unit 18 can be in the form of a memory address at which the random seed value is to be stored within the remote unit 14 or an actual position within the data stream at which the value is to be placed. Preferably, the location determined by the location determination unit 18 will be randomly selected within the identified address space.

The interrogation message assembly unit 22 collects the random seed value, the location information, and the memory range information from the random data generator 16, the location determination unit 18, and the memory range determination unit 20, respectively, and uses the information to generate an interrogation message to be delivered to the remote communication unit 14. Preferably, the interrogation message assembly unit 22 will utilize a message format that is recognizable by the remote communication unit 14. The interrogation message assembly unit 22 delivers the assembled message to the transmit/receive unit 26 which transmits the interrogation message, along with any required addressing information, to the remote communication unit 14 via the network 12. In addition, the transmit/receive unit 26 performs any signal formatting on the message that is required by the network 12 (e.g., encoding, up-conversion, etc).

The remote communication unit 14 receives the interrogation message from the verification unit 10 and uses the information therein to perform a hashing operation within the unit to generate a hash value. The hash value generated within the remote unit 14 will be referred to herein as the verification value. The remote communication unit 14 then delivers a response message that includes the verification value back to the verification unit 10 via the network 12. The transmit/receive unit 26 receives the response message from the remote communication unit 14 and directs the verification value to the integrity determination unit 28 for use in integrity verification. In one embodiment of the present invention, digital signatures are used by the verification unit 10 and the remote unit 14 to authenticate the source of the interrogation message and the response message.

The local communication unit 24 is preferably an exact replica of the remote communication unit 14 being verified. The interrogation message assembly unit 22 sends the same interrogation message to the local communication unit 24 that it sends to the remote communication unit 14. Like the remote communication unit 14, the local communication unit 24 uses the information within the interrogation signal to perform a hashing operation within the local unit 24 to generate a hash value. The hash value generated within the local communication unit 24 will be referred to herein as the control value. The control value generated by the local communication unit 24 is transferred to the integrity determination unit 28 for use in integrity verification. The integrity determination unit 28 compares the integrity value received from the remote communication unit 14 to the control value received from the local communication unit 24 to determine whether the remote communication unit 14 has been modified. If the comparison indicates that modifications have occurred within the remote communication unit 14, the integrity determination unit 28 initiates further investigation. This further investigation can include, for example, additional interrogations or queries being sent to the customer associated with the particular remote communication unit 14.

In one embodiment of the invention, a number of different local communication units 24 are used within the verification unit 10 that correspond to a number of possible remote communication unit configurations or types. That is, a particular service provider may support multiple different types of end-user equipment to provide services to customers. Alternatively, or in addition, a service provider may provide a single type of equipment that can be configured in a plurality of different ways. Thus, the verification unit 10 can include a local unit 24 corresponding to each possible remote unit type or configuration. After it is determined that a particular remote unit is to be tested, a local communication unit 24 is selected for use in the verification process that corresponds to the remote unit under test. Thus, a local unit is chosen that will have identical content within its internal memory space to the remote unit under test should the remote unit under test remain unmodified.

In a preferred embodiment, the remote communication unit 14 is preloaded with software that is capable of responding to the interrogation message generated within the verification unit 10. Thus, after receiving the interrogation message, the remote communication unit 14 automatically separates out the random seed value, the location information, and the memory range information and uses it to perform a hashing operation. At least one hashing algorithm will typically be stored within the remote communication unit 14 for use in performing the hashing operation.

The remote communication unit 14 initiates the hashing operation by executing the appropriate hashing algorithm and feeding the appropriate data to the algorithm. The remote communication unit 14 generates an input data stream to be operated upon by the hashing algorithm by, among other things, reading the identified memory range(s) within the remote unit 14. The remote communication unit 14 also includes functionality for causing the random seed value to be properly located within the data stream (i.e., at the location indicated within the interrogation message) before the data stream is processed by the hashing algorithm. In one approach, the remote communication unit 14 simply stores the random seed value in an appropriate memory location of the remote unit 14 before the data is read from the memory to generate the stream. The data that is supposed to be within that memory location is temporarily moved to another memory location and is replaced after the data stream has been generated. In another approach, the random seed value is placed directly into the data stream after the data has been read from the memory, thus replacing some data already in the data stream. For example, the particular hashing algorithm that is used can include functionality for inputting a random seed value and a location and for substituting the value into the input stream during the hashing operation.

The result of the hashing operation is a fixed length data value that is unique to the information that was hashed. As described above, this value is sent back to the verification unit 10 where it is compared to the hash value generated within the local communication unit 24. If the two values are not the same, this indicates that there have been modifications within the data stored within the remote communication unit 14. Thus, an attack may have occurred and further investigation is required.

In one technique, the memory range or ranges that are identified within the interrogation message are selected to include the address space within the remote communication unit 14 that includes the hashing algorithm itself (or a portion thereof). Thus, while the hashing algorithm is being executed, the data stored within the corresponding address space will be changing in a dynamic fashion. This dynamic change in memory content provides an additional layer of randomness that further increases the difficulty of predicting the correct response to the interrogation message beforehand. Thus, this technique can be used to interrogate a remote unit when it is suspected that a corresponding customer location may include a hacker having significant resources at his disposal for performing incursion activities.

In another aspect of the present invention, the interrogation signal sent to the remote communication unit 14 can include a request for internal performance information to be sent to the verification unit 10 in addition to the integrity value discussed above. For example, the interrogation message can include a request for the remote communication unit 14 to track and report the number of interrupts that are generated during the corresponding hashing operation. After the hashing operation has completed, the total number of interrupts is then returned to the verification unit 10 with the integrity value. As before, the same interrogation message is delivered to the local communication unit 24 which also tracks and reports the operational parameter data. The resulting parameter values are then compared within the integrity determination unit 28. Any number of different operational parameters can be tracked and reported in this manner in accordance with the invention.

In yet another aspect of the present invention, the time that the remote unit 14 takes to respond to an interrogation message is used as a further indication of the integrity of the remote unit 14. In general, the amount of time the remote unit 14 takes to perform the functions requested in the interrogation message should be the same as or very close to the amount of time it takes the local communications unit 24 to perform the same functions. Thus, if the remote unit 14 has not been compromised, the total time it takes to return the requested information to the verification unit 10 should be approximately equal to the time it takes the local unit to generate the same information plus the round trip transit time through the network 12. In one approach, a network transit time estimation program is utilized to estimate the round trip transit time through the network 12 based upon current traffic levels in the system. Such algorithms are generally well known in the art. The estimated transit time is then used to develop a time window within which the requested information should be received from the remote communications unit 14 if the remote unit 14 has not been compromised. If the requested information is received after this time, it is determined that an attack may have occurred within the remote unit 14 and, if required, further testing is performed to corroborate this. Typically, the time window will be calculated based upon a worst-case estimated transit time through the network so that false alarms are minimized. In addition, a grace period can be used to further minimize false alarms.

In still another aspect of the present invention, the particular hashing algorithm that is used within the remote communication unit 14 for integrity verification is delivered to the remote unit 14 along with or at approximately the same time as the interrogation message. In one approach, for example, the verification unit 10 randomly selects one of a plurality of different hash algorithms from a library of algorithms after a decision has been made to verify a particular remote unit. The verification unit 10 then assembles an interrogation message as described previously and sends the interrogation message and the selected algorithm to the remote communication unit 14 at approximately the same time. The remote communication unit 14 then executes the algorithm in accordance with the parameter values contained within the interrogation message and delivers the resulting value back to the verification unit 10 for comparison. After the hash value has been calculated, the remote communication unit 14 can delete the algorithm from its memory space.

Figure 2:
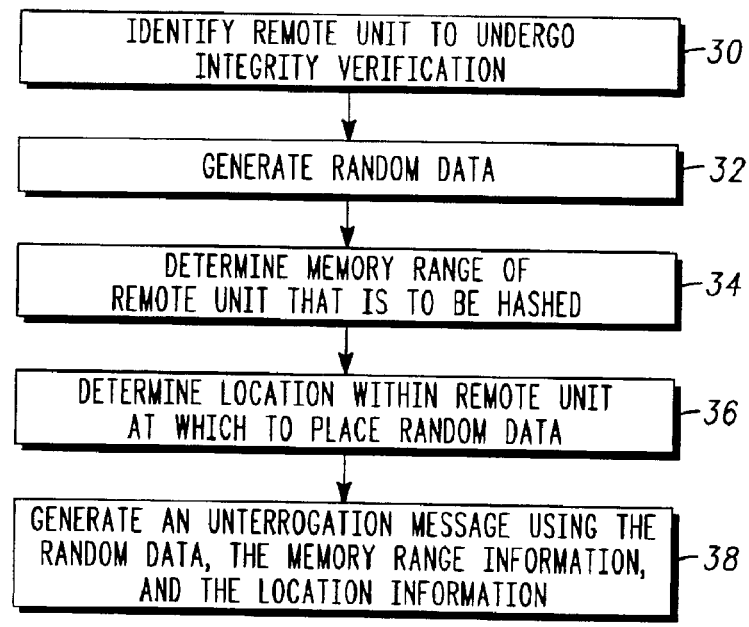
FIGS. 2 and 3 are portions of a flowchart illustrating a method for verifying the integrity of a remote unit in a communication system in accordance with one embodiment of the present invention.
Figure 3:
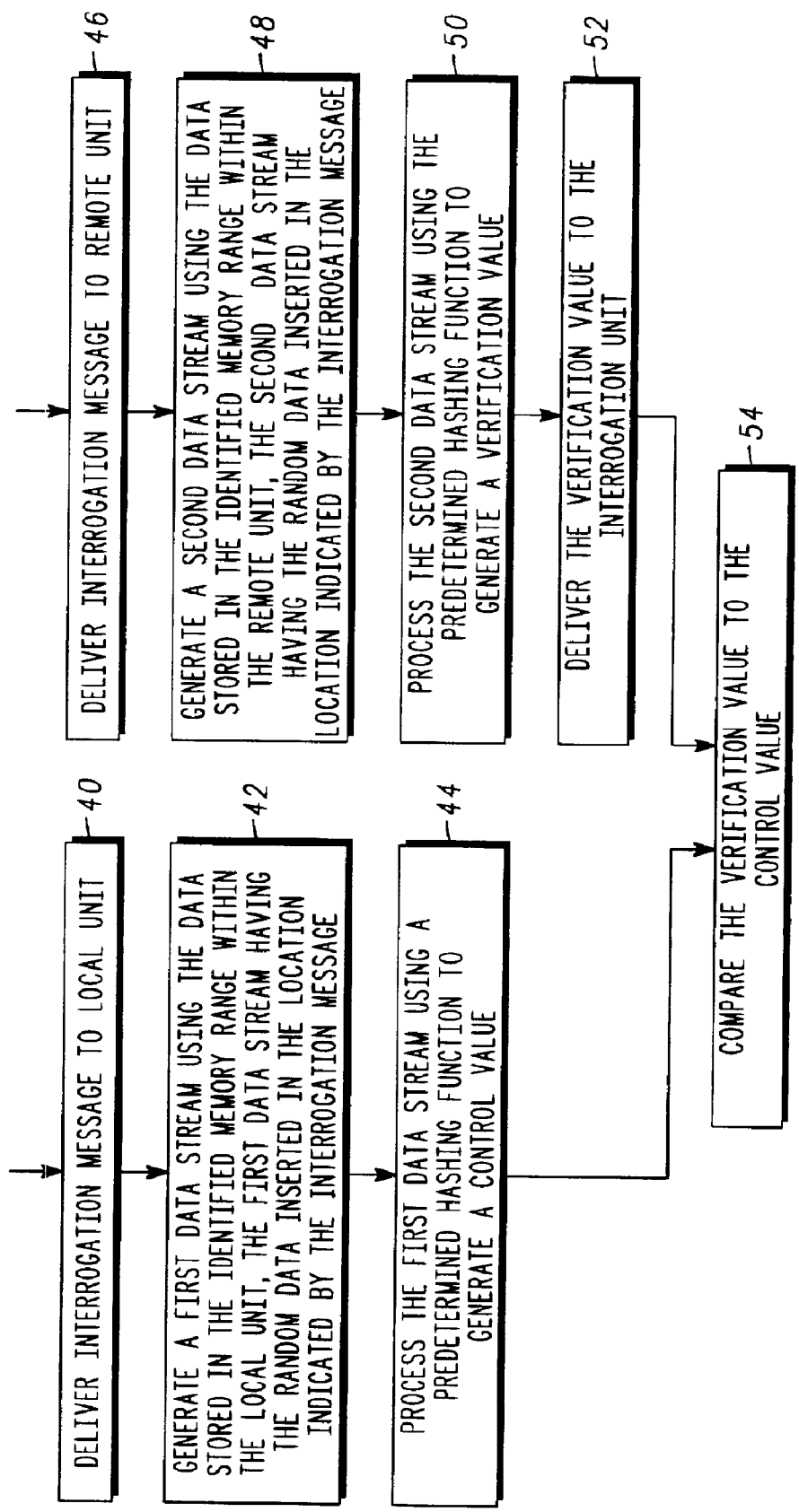

FIGS. 2 and 3 are portions of a flowchart illustrating a method for verifying the integrity of a remote unit in a communication system. First, a remote communication unit is identified for integrity verification (step 30). Random seed data is then generated (step 32). A memory range within the remote unit that is to undergo hashing is next determined (step 34). The memory range can include a single contiguous address space or multiple noncontiguous spaces. In general, any portion of the addressable memory space within the remote unit can be subject to hashing, including both static memory portions (e.g., read-only memory and flash memory), random access memory (RAM) portions, and memory mapped input/output (I/O) portions.

Next, a location at which to place the random data within the remote unit is determined (step 36). The location can include a memory location or a location within a corresponding data stream. An interrogation message is next assembled using the random data, the memory range information, and the location information (step 38). The interrogation message is then delivered to both a local communication unit (step 40) and the remote communication unit (step 46). In one approach, the interrogation message is delivered to both of the communication units at substantially the same time; however, this is not required. In another approach, the interrogation message is not delivered to the remote unit until hash results are received from the local unit. Other timing techniques are also possible.

When the local unit receives the interrogation message, it generates a first data stream based on the parameter values within the interrogation message (step 42). That is, the first data stream includes the random seed data appropriately located within the data read from the memory range(s) of the local unit identified within the interrogation message. As described previously, to generate the first data stream, the random seed data can be stored at an appropriate location within the memory space of the local unit before the data stream is generated or the random data can be substituted into the data stream at the appropriate location after the data stream has been generated. The first data stream is next processed using a predetermined hashing algorithm that is resident within the local unit (step 44). This hashing operation generates a control value.

A second data stream is generated within the remote unit based on the parameter values within the interrogation message (step 48). As with the first data stream, the second data stream includes the data that is stored within the memory range(s) of the remote unit identified by the interrogation message. The second data stream also includes the random data inserted at the appropriate location. The second data stream is processed using the same hashing algorithm used in the local unit, which is also resident within the remote unit (step 50). This hashing operation generates a verification value. The verification value is next transmitted back to the interrogating unit for use in integrity verification (step 52). The control value is then compared to the verification value to determine whether any modifications have taken place within the remote unit (step 54). If the two values are different, it is determined that modifications have taken place and further investigation is initiated.

Although the present invention has been described in conjunction with its preferred embodiments, it is to be understood that modifications and variations may be resorted to without departing from the spirit and scope of the invention as those skilled in the art readily understand. For example, the invention is not limited to systems that send a single interrogation signal to remote communication units within a communication system. That is, multiple separate signals can be used to convey the interrogation parameters to a particular remote unit in accordance with the present invention. In addition, instead of using a local communication unit that is an exact replica of the remote unit being verified, an addressable memory that includes the identical content of an uncompromised remote unit can be used as a local unit. Such modifications and variations are considered to be within the purview and scope of the invention and the appended claims.

What is claimed is:

1. A method for use in verifying the integrity of a remote unit in a communication system, said method comprising:

generating a random value;

determining memory range information identifying a range of memory space within the remote unit having data to be hashed by a hashing function;

determining position information indicative of a position within a data stream to be generated within the remote unit at which said random value is to be located;

delivering said random value, said memory range information, and said position information to the remote unit for use by the remote unit in performing a hashing operation; and receiving a hash value from said remote unit, said hash value being a result of a hashing operation performed within said remote unit based upon said random value, said memory range information, and said position information delivered to the remote unit.

2. The method claimed in claim 1, further comprising the step of:

comparing said hash value received from said remote unit to a hash value generated outside said remote unit to determine whether modifications have been made within said remote unit.

3. The method claimed in claim 2, wherein:

said hash value generated outside said remote unit is generated within a communication unit that is a replica of said remote unit.

4. The method claimed in claim 2, wherein:

said hash value generated outside said remote unit is a result of a hashing operation performed outside the remote unit based upon said random value, said memory range information, and said position information.

5. The method claimed in claim 1, wherein:

said steps of generating, determining memory range information, determining position information, and delivering are performed in a location that is different from the location of said remote unit.

6. A computer readable medium having program instructions stored thereon that implements the method of claim 1 when executed within a digital processing device.

7. A communication apparatus for use in verifying the integrity of a remote unit in a communication system, comprising:

a random value generator for generating a random value;

a memory range determination unit for determining memory range information identifying a memory range within the remote unit for use in generating a data stream that will be processed by a hashing function within the remote unit;

a location determination unit for determining location information that is indicative of a position within the data stream generated within the remote unit at which said random value is located;

a transmitter for transmitting said random value, said memory range information, and said location information to the remote unit for use in performing a hashing operator therein;

a local memory storing information that is representative of information that should be stored in the remote unit; and a hash unit for performing a hashing operation on information stored within said local memory to generate a control value, said hashing operation being performed using said random value, said memory range information, and said location information.

8. The communication apparatus of claim 7, further comprising:

an interrogation message assembly unit for generating an interrogation message including said random value, said memory range information, and said location information.

9. The communication apparatus of claim 8, wherein:
said transmitter transmits said interrogation message to the remote unit via a communication network.

10. The communication apparatus of claim 7, further comprising:
a receiver for receiving a hash value from the remote unit, said hash value having been generated within the remote unit by performing a hashing operation within the remote unit based upon said random value, said memory range information, and said location information.

11. The communication apparatus of claim 10, further comprising:
a comparison unit for comparing the hash value received from the remote unit to the control value generated by the hash unit.

12. The communication apparatus of claim 7, further comprising:
a selection unit for selecting a hashing algorithm from a plurality of hashing algorithms for use by the remote unit to perform said hashing operation; and
means for indicating a selected hashing algorithm to the remote unit.

13. A communication unit for use within a communication system comprising:
means for receiving an integrity verification request from a requesting entity, said integrity verification request including a random value, placement information indicating a desired position for said random value within a data stream, and memory range information identifying a memory range within the communication unit that is to be processed using a hashing function;
means for generating a data stream using data from said memory range and said random value, said random value being located within said data stream at a position indicated by said placement information;
means for performing a hashing operation on said data stream to generate a hash value; and
means for transmitting said hash value to said requesting entity.

14. The communication unit claimed in claim 13, wherein:
said means for generating a data stream includes means for storing said random value in a memory location within said communication unit corresponding to said placement information and means for reading data from said memory range of said communication unit indicated within said integrity verification request to generate said data stream.

15. The communication unit claimed in claim 13, wherein:
said means for generating a data stream includes means for reading data from said memory range of said communication unit to generate a first data stream and means for inserting said random value into said first data stream at a position indicated by said placement information to generate a second data stream.

16. The communication unit claimed in claim 13, further comprising: means for receiving a hashing algorithm from said requesting entity for use by said means for performing a hashing operation.

* * * * *